United States Patent
Nam et al.

(10) Patent No.: US 9,536,347 B2
(45) Date of Patent: Jan. 3, 2017

(54) APPARATUS AND METHOD FOR FORMING LIGHT FIELD IMAGE

(71) Applicant: Samsung Electronics Co., Ltd., Suwon-si (KR)

(72) Inventors: Dong Kyung Nam, Yongin-si (KR); Do Kyoon Kim, Seongnam-si (KR); Ju Yong Park, Seongnam-si (KR); Min Su Ahn, Seoul (KR); Jin Ho Lee, Suwon-si (KR); Seo Young Choi, Seoul (KR); In Woo Ha, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 278 days.

(21) Appl. No.: 14/155,707

(22) Filed: Jan. 15, 2014

(65) Prior Publication Data
US 2014/0300602 A1    Oct. 9, 2014

(30) Foreign Application Priority Data

Apr. 5, 2013    (KR) .................. 10-2013-0037439

(51) Int. Cl.
G06T 15/50    (2011.01)
H04N 13/00    (2006.01)
H04N 13/02    (2006.01)

(52) U.S. Cl.
CPC ........... G06T 15/50 (2013.01); H04N 13/0011 (2013.01); H04N 13/0242 (2013.01)

(58) Field of Classification Search
None
See application file for complete search history.

(56) References Cited

U.S. PATENT DOCUMENTS

| | | | |
|---|---|---|---|
| 6,097,394 A | 8/2000 | Levoy et al. | |
| 2004/0114794 A1 | 6/2004 | Vlasic et al. | |
| 2007/0030543 A1 | 2/2007 | Javidi et al. | |
| 2008/0297593 A1* | 12/2008 | Debevec | G02B 27/225 348/51 |
| 2009/0009593 A1* | 1/2009 | Cameron | H04N 13/0459 348/51 |
| 2010/0149182 A1 | 6/2010 | Butler et al. | |
| 2010/0253917 A1* | 10/2010 | Gao | G02B 27/225 353/7 |
| 2010/0271467 A1 | 10/2010 | Akeley | |
| 2011/0128412 A1 | 6/2011 | Milnes et al. | |

(Continued)

FOREIGN PATENT DOCUMENTS

| | | |
|---|---|---|
| GB | 2 452 546 A | 3/2009 |
| JP | 7-184115 A | 7/1995 |

(Continued)

OTHER PUBLICATIONS

M. Slater; A Note on Virtual Light Fields; University College London, 2000.*

(Continued)

*Primary Examiner* — Carlos Perromat
(74) *Attorney, Agent, or Firm* — NSIP Law

(57) ABSTRACT

An apparatus and method for forming a light field image includes projecting vertices of a graphic object to a far plane corresponding to a first distance directed to a screen reproducing a light field, and forming the light field image with respect to the graphic object using the vertices projected to the far plane.

20 Claims, 15 Drawing Sheets

(56) References Cited

U.S. PATENT DOCUMENTS

2012/0127320 A1  5/2012  Balogh

FOREIGN PATENT DOCUMENTS

| KR | 10-2010-0040643 | 4/2010 |
| KR | 10-2011-0042936 | 4/2011 |
| KR | 10-2011-0047122 | 5/2011 |
| KR | 10-2011-0059247 | 6/2011 |
| WO | WO 98/49667 A2 | 11/1998 |

OTHER PUBLICATIONS

M. Levoy, P. Hanrahan; Light Field Rendering; Proceedings of ACM SIGGRAPH'96; 1996.*

Naemura, T., et al., "Real-Time Video-Based Modeling and Rendering of 3D Scenes," IEEE Computer Graphics and Applications, vol. 22, No. 2, Mar./Apr. 2002, (8 pages, in English).

Fukushima, N., et al. "Real-Time Arbitrary View Interpolation and Rendering System using Ray-Space," Proceedings of the International Society for Optics and Photonics (SPIE) Conference on Three-Dimensional TV, Video, and Display IV, Optics East 2005, Oct. 23, 2005, Boston, MA (12 pages, in English).

Takahashi, K., et al., "Layered light-field rendering with focus measurement," Signal Processing: Image Communication vol. 21 No. 6 (Mar. 2006), pp. 519-530.

Georgiev, T., et al. "Spatio-Angular Resolution Tradeoff in Integral Photography," Proceedings of the $17^{th}$ Eurographics Symposium on Rendering Techniques (EGSR 2006), Jun. 26-28, 2006, Nicosia, Cyprus (10 pages, in English).

Fukushima, N., et al. "Real-Time Free Viewpoint Image Rendering by Using Fast Multi-Pass Dynamic Programming," Proceedings from the 3DTV-Conference: The True Vision-Capture, Transmission and Display of 3D Video (3DTV-CON), Jun. 7-9, 2010, Tampere, Finland (4 pages, in English).

European Search Report issued on Oct. 6, 2014, in counterpart European Application No. 14161016.2 (9 pages, in English).

* cited by examiner

APPARATUS AND METHOD FOR FORMING LIGHT FIELD IMAGE

CROSS-REFERENCE TO RELATED APPLICATIONS

This application claims the priority benefit of Korean Patent Application No. 10-2013-0037439, filed on Apr. 5, 2013, in the Korean Intellectual Property Office, the disclosure of which is incorporated herein by reference.

BACKGROUND

1. Field

The following description relates to a method and apparatus for forming a light field image.

2. Description of the Related Art

A 3-dimensional (3D) display technology is being applied to various fields of image display, such as a movie projector, a television (TV), a mobile phone, and the like. An ultimate object of the 3D display is to provide a user in a virtual environment with a stereoscopic effect equivalent to a stereoscopic feeling perceived in a real environment. For this purpose, variety types of techniques such as a stereo method, a multiview method, and the like are being researched. A light field method, among the various techniques, may express 3D spatial information more accurately in comparison to the stereo method or the multiview method.

SUMMARY

In a 3D display, if locations of a rendering camera, located at a viewing position, and a display projector, located at a projection position, differ, a captured light field is transformed to reconstruct the light field for display. Accordingly, the transformation may be avoided by locating the rendering camera at the projection position. This placement results in capturing a front view of the object from a rear position, and adjusting the image for an observation position of a viewer.

According to example embodiments, a method for forming a light field image may include receiving vertices of a graphic object, projecting the vertices of the graphic object to a far plane reproducing a light field, and forming a light field image, with respect to the graphic object, using the vertices of the graphic object projected to the far plane.

The projecting may include transforming at least one vertex of the graphic object, which is located at a first distance from at least one camera among the vertices, to be located at a second distance from the at least one camera, and transforming at least one vertex of the graphic object, which is located at the second distance from at least one camera among the vertices, to be located at the first distance from the at least one camera.

The projecting may include performing matrix calculation projecting at least one vertex of the graphic object with respect to at least one camera to the far plane, and determining coordinate values of the graphic object projected to the far plane using a result of the matrix calculation.

The method may further include receiving top, bottom, left, and right positions of a screen to which the graphic object is to be projected, and a first distance and a second distance directed to the screen.

The first distance may correspond to a farthest position from the position of the camera in a direction to the screen at which the graphic object may be entirely expressed, and the second distance may correspond to a nearest position at which the graphic object may be entirely expressed.

According to example embodiments, a method for forming a light field image may include generating light field information by performing light field photographing with respect to a graphic object using at least one camera, the at least one camera having a view position or direction the same as a view position or direction of at least one projector expressing a light field, transforming the light field information based on an observation position of a viewer, and forming the light field image by providing the transformed light field information to the at least one projector.

The observation position of the viewer may include an observation height of the viewer The transforming may include transforming the light field information based on the observation position of the viewer on a first plane located in a direction to the viewer.

The transforming of the light field information based on the observation position on the first plane may include determining a first coordinate at which a straight line connecting from the at least one camera to any one vertex of the graphic object meets the first plane, moving the first coordinate to a second coordinate corresponding to the observation position of the viewer, determining a third coordinate at which a straight line passing through the second coordinate and any one vertex of the graphic object meets a second plane located in a direction to the screen reproducing the light field, and transforming the light field information using the third coordinate.

The method may further include receiving information including a position of the at least one camera, a position of the first plane, and a position of the second plane.

The forming of the light field image may include projecting the transformed light field information to a far plane corresponding to a first distance directed to the screen reproducing the light field, and forming the light field image by providing the transformed light field information projected to the far plane to at least one projector.

The projecting may include transforming light field information located at the first distance from the at least one camera among the transformed light field information, to be located at a second distance from the at least one camera, and transforming the light field information located at the second distance from the at least one camera among the transformed light field information, to be located at the first distance from the at least one camera.

The projecting may include performing a matrix calculation projecting the transformed light field information from at least one camera to the far plane, and determining coordinate values of the light field information projected to the far plane using a result of the matrix calculation.

The method may further include receiving top, bottom, left, and right positions of a screen to which a graphic object is to be projected, and a first distance and a second distance directed to the screen.

According to example embodiments, an apparatus for forming a light field image may include an input unit to receive vertices of a graphic object, a projection unit to project the vertices of the graphic object to a far plane corresponding to a first distance directed to a screen reproducing a light field, and a forming unit to form the light field image using the vertices projected to the far plane.

The projection unit may include a transformer to transform at least one vertex of the graphic object, which is located at a first distance farthest from at least one camera among the vertices, to be located at a second distance nearest to the at least one camera and to transform at least one vertex located at the second distance nearest to the at least one camera to be located at the first distance farthest from the at least one camera.

The projection unit may include a calculator to perform matrix calculation that projects at least one vertex of the graphic object from one camera to the far plane, and a determiner to determine coordinate values of the graphic object projected to the far plane using the calculation result of the calculator.

According to example embodiments, an apparatus for forming a light field image may include a light field forming unit to form light field information by performing light field photographing with respect to a graphic object using at least one camera, the at least one camera having a view position or direction same as a view position or direction of the at least one projector expressing a light field, a transform unit to transform the light field information based on an observation position of a viewer, and an image forming unit to form the light field image by providing the transformed light field information to the at least one projector.

The transform unit may include a first determiner to determine a first coordinate at which a straight line connecting from at least one camera to any one vertex of the graphic object meets the first plane, a mover to move the first coordinate to a second coordinate corresponding to the observation position of the viewer, and a second determiner to determine a third coordinate at which a straight line passing through the second coordinate and any one vertex of the graphic object meets a second plane located in a direction to a screen reproducing the light field, and the light field information may be transformed using the third coordinate.

The image forming unit may include a projection unit to project the transformed light field information to a far plane corresponding to a first distance directed to the screen reproducing the light field, and a forming unit to form the light field image by providing the transformed light field information projected to the far plane to at least one projector.

The projection unit may include a calculator to perform matrix calculation that projects at least one vertex of the graphic object from one camera to the far plane, and a determiner to determine coordinate values of the graphic object projected to the far plane using a calculation result of the calculator.

According to example embodiments, a method of projecting a three-dimensional object onto a screen may include capturing a light field of the object using a rendering camera located at a position where a display projector generates the light field, and projecting the captured light field of the object, where the captured light field corresponds to a front view of the object captured from a position behind the object corresponding to the position where the display projector reproduces the light field.

Additional aspects, features, and/or advantages of example embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the example embodiments, taken in conjunction with the accompanying drawings of which.

DETAILED DESCRIPTION

Figure 1:
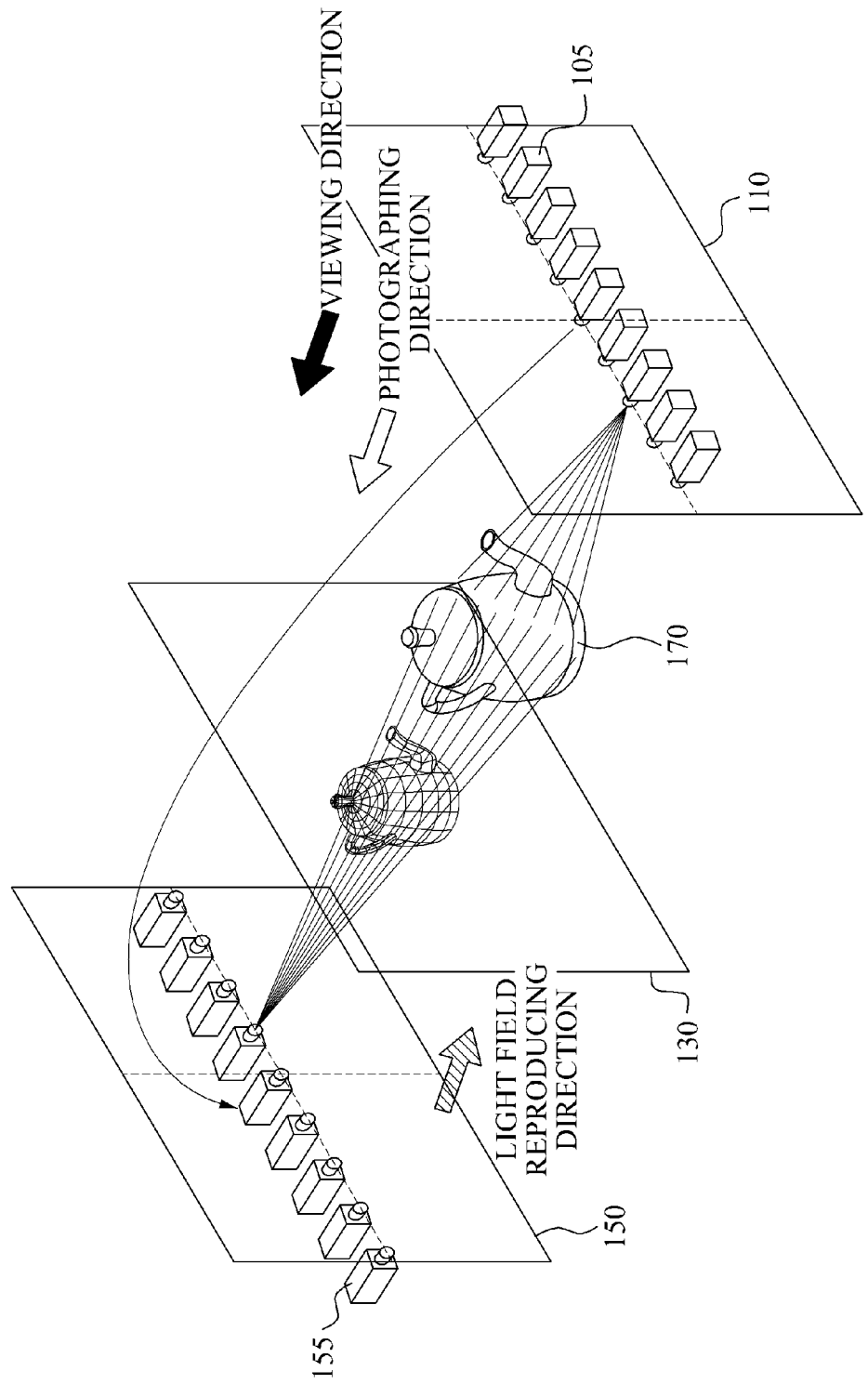
FIG. 1 illustrates a concept that a camera view is transformed to a projector view by a light field image forming method according to example embodiments.

Reference will now be made in detail to example embodiments, examples of which are illustrated in the accompanying drawings, wherein like reference numerals refer to like elements throughout.

In the following description, a light field refers to a distribution state of light in a space expressed by distribution of light rays. According to the concept of the light field, light reflected or generated from an object is defined to advance in a straight line in space and enter a human eye. A 3-dimensional (3D) space may include a great number of light fields.

For example, a 5-dimensional (5D) plenoptic function may be used to mathematically express individual light fields. That is, the light field may be indicated by a 3D spatial coordinate (x, y, z) of a point at which a light ray passes through a particular plane in space and by brightness related to a space direction angle ($\theta$, $\phi$) to which the light ray is directed.

The light field may be captured by expressing plenoptic function values of light passing through the particular plane in the form of data. That is, the light field may be captured by brightness values per space direction angle ($\theta$, $\phi$) with respect to the coordinates (x, y, z) in a predetermined region.

A light field camera refers to a camera adapted to capture a light field. Whereas a 2D camera is adapted to record brightness values per space direction angle ($\theta$, $\phi$) with respect to one particular point, that is, point of view, in space, the light field camera may record brightness values per space direction angle ($\theta$, $\phi$) with respect to all coordinate values in the predetermined region.

FIG. 1 illustrates a camera view transformed to a projector view by a light field image forming method according to example embodiments.

Referring to FIG. 1, when a viewer looks at a screen from a right lower end to a left upper end of a viewer plane 110, a plurality of cameras 105 capturing a stereoscopic image may capture an image of a graphic object 170 looking from the right lower end to the left upper end of the viewer plane 110, that is, in a same direction as a viewing direction of the viewer. Although the cameras are illustrated in a horizontal line in FIG. 1, the disclosure is not limited to this arrangement, and the cameras may be positioned in any arrangement in the viewer plane 110. For example, the cameras may be arranged in a vertical line, an angled line, or a zigzag pattern in the viewer plane.

In general, the plurality of cameras 105 are used to capture the light field. Light field information generated at views of the respective cameras 105 may be captured.

When a rear projection method is used to express the light field, by arranging a plurality of projectors 155 on a source plane 150 disposed behind a screen plane 130 as shown in FIG. 1, the light field information generated corresponding to each projector 155 may be different from the light field information captured corresponding to each camera 105.

Therefore, to solve the difference, the light field information captured from the plurality of cameras 105 should be transformed into the light field information corresponding to the projectors 155.

A 2D image display captures and expresses image information generated by projecting 3D space information 2 dimensionally. Therefore, a difference between a capture view and an expression view may not cause any problem. However, when capturing and expressing a light field of the 3D space, when a camera view for capturing the light field and a projector view for expressing the light field are different, image information of an image captured by a camera may not be directly used by a projector.

Therefore, according to example embodiments, when forming a light field image through computer graphic rendering, rendering may be performed by moving a view of a rendering camera to the projector view of the source plane 150 rather than the viewing view of the viewer plane 110. Therefore, the light field information captured by the projectors may be directly used without transformation. Also, the light field may be generated quickly and accurately.

Figure 2:
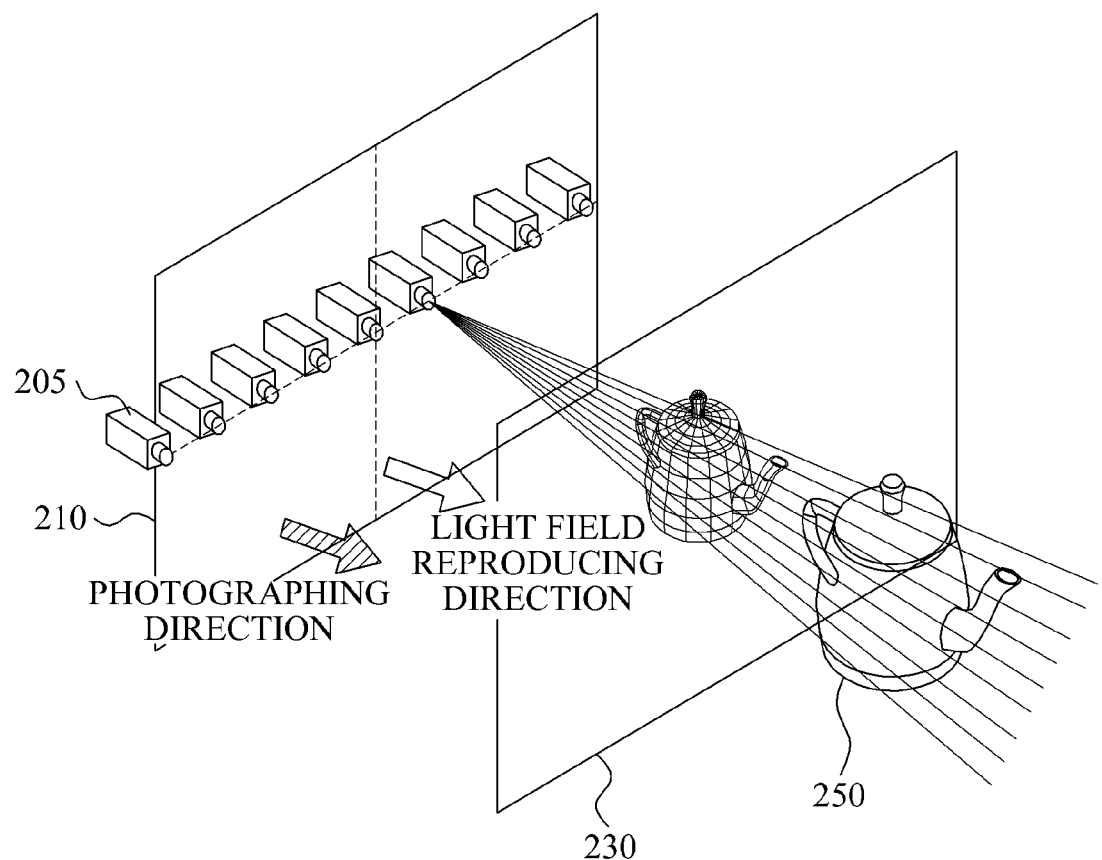
FIG. 2 illustrates a concept that a light field of a rear side view is captured by a light field image forming method according to example embodiments.

FIG. 2 illustrates a light field of a rear view captured by a light field image forming method according to example embodiments.

Referring to FIG. 2, a view and direction of a camera is transformed to a projector position through camera arrangement of a computer graphic for capturing the rear view light field.

Because a light field that actually reproduces a stereoscopic image is generated from projectors, when light field information is captured by changing the camera view to the projector view, the captured light field information may be directly used as an input to the projector, without additional transformation.

In case of a computer graphic image, light field information of a desired location may be extracted through calculation. Therefore, although the camera is disposed behind an object, light field information for a front of the object may be captured. Thus, the light field information which may be directly used as the input of the projector may be captured without additional transformation.

That is, according to the example embodiments, during photographing of the light field, positions of the cameras 205 may correspond, not to a viewing position of the viewer, but to positions of projectors expressing the light field, that is, the source plane 210. Therefore, the light field information related to a graphic object 250 photographed by the cameras 205 may be reproduced directly by the projectors and expressed on a screen 230.

When the light field is photographed with the positions of the cameras 205 corresponding to the positions of the projectors, two considerations may be made.

First, the front of the object should be photographed from the rear of the object. Second, expression characteristics of horizontal-parallax-only (HPO) should be implemented.

Hereinafter, a method of photographing the front of the object from the rear of the object will be described with reference to FIGS. 3 to 8. A method of implementing the expression characteristics of HPO will be described with reference to FIGS. 9 to 12.

Figure 3:
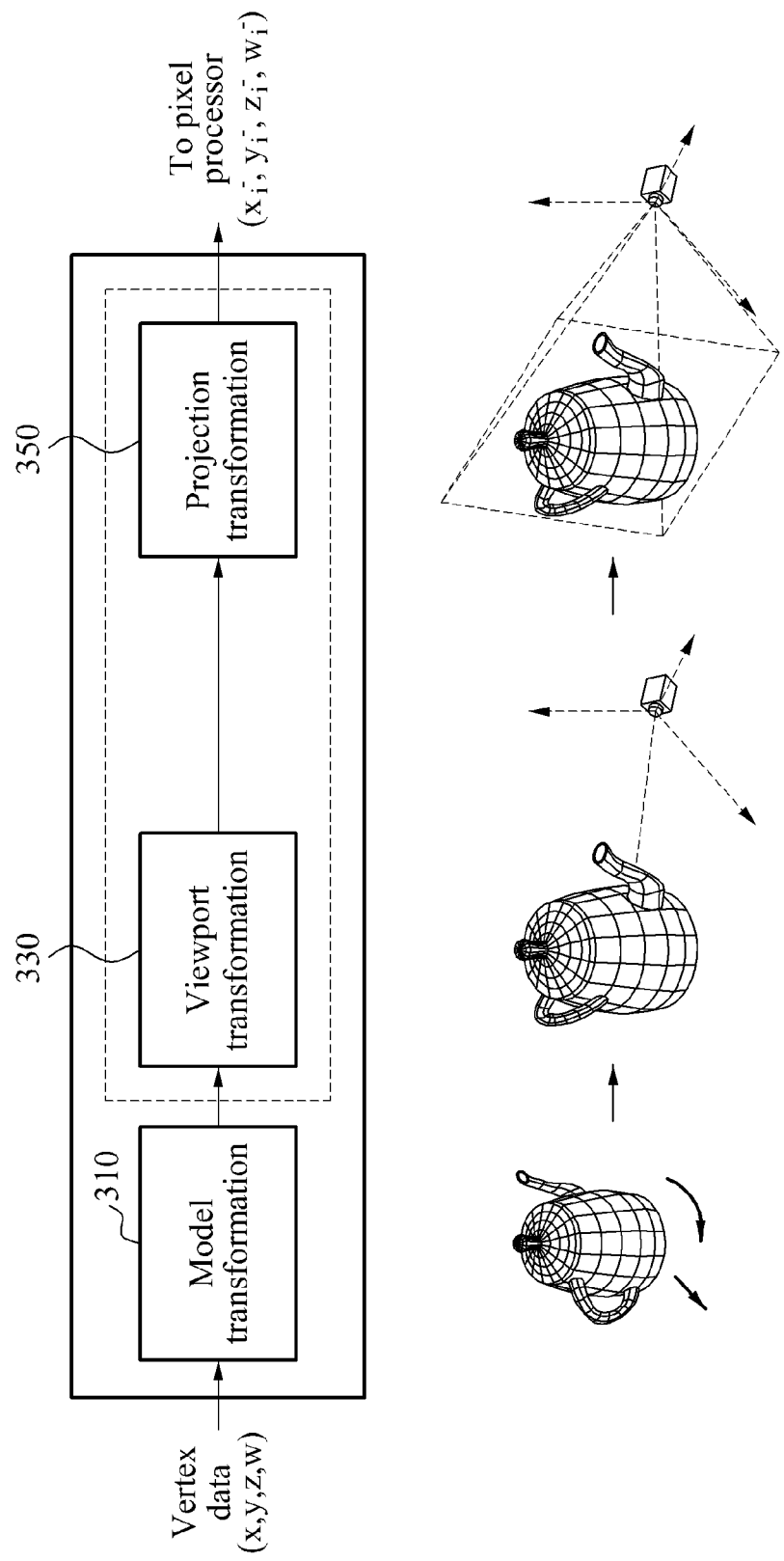
FIG. 3 illustrates a process of processing vertices of a graphic object by a light field image forming method according to example embodiments.

FIG. 3 illustrates a process of processing vertices of a graphic object by a light field image forming method according to example embodiments.

Referring to FIG. 3, an apparatus for forming a light field image (hereinafter, will be referred to as a 'forming apparatus') may perform model transformation 310 with respect to vertices x, y, z, and w of an input graphic object.

During the model transformation 310, the forming apparatus may perform shift, rotation, scale translation, and the like with respect to a 3D mesh model including the vertices x, y, z, and w of the graphic object, and may store a position, a posture, and a result of the scale translation of the 3D mesh model. A position of a camera may be fixed during the model transformation 310.

The forming apparatus may perform viewport transformation 330 using information captured by the model transformation 310. The viewport refers to a rectangular region that actually displays a figure which is projection transformed during rendering for forming an image. Generally, although a coordinate on a screen performs only logical calculation, the viewport should correspond to a coordinate system such as a display that actually displays the figure. Therefore, coordinate transformation calculation by the viewport transformation may be performed to express the figure calculated by the coordinate system of the screen.

During the viewport transformation 330, the forming apparatus may apply a movement to the camera, for example, by changing the position of the camera or rotating the camera, and may accordingly determine a light field direction and the like.

The forming apparatus may perform projection transformation 350 using a result of the viewport transformation 330. During the projection transformation 350, the forming apparatus may reflect variation of coordinate values at a camera coordinate system in consideration of a field of view of the camera. The forming apparatus may express rear information of the object through the projection transformation 350.

According to the example embodiments, the forming apparatus may perform only the projection transformation 350, omitting the viewport transformation 330. For example, when a projector is disposed behind the screen and a display is capable of expressing vertical and horizontal directions, the forming apparatus may perform only the projection transformation 350.

Figure 4:
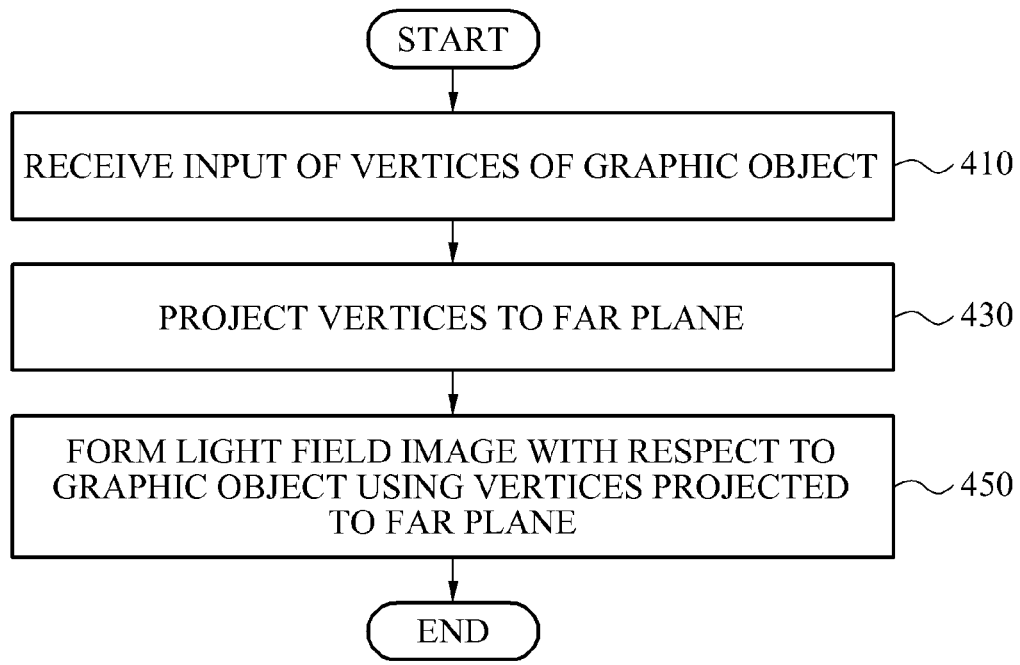
FIG. 4 illustrates a light field image forming method according to example embodiments.

FIG. 4 illustrates a light field image forming method according to example embodiments.

Referring to FIG. 4, a forming apparatus according to example embodiments may receive vertices of a graphic object in operation 410.

The forming apparatus may project the vertices to a far plane in operation 430. The far plane may refer to a plane corresponding to a first distance in a direction to the screen reproducing the light field.

In operation 430, the forming apparatus may transform at least one vertex of the graphic object located at the first distance which is farthest from at least one camera among vertices of the graphic object, to be located at a second distance which is nearest to the at least one camera. In addition, the forming apparatus may transform at least one vertex of the graphic object located at the second distance to be located at the first distance.

Here, the first distance may correspond to a farthest position from the position of the projector or the camera in a direction to the screen, at which the graphic object may be entirely expressed. The second distance may correspond to a nearest position at which the graphic object may be entirely expressed. The first distance and the second distance may be input by the viewer along with positions of upper and lower ends and left and right sides of the screen to which the graphic object is to be projected.

Furthermore, a method of projecting the vertices of the graphic object to the far plane by the forming apparatus will be described in detail with reference to FIG. 5.

In operation 450, the forming apparatus may form a light field image with respect to the graphic object using the vertices of the graphic object projected to the far plane.

Figure 5:
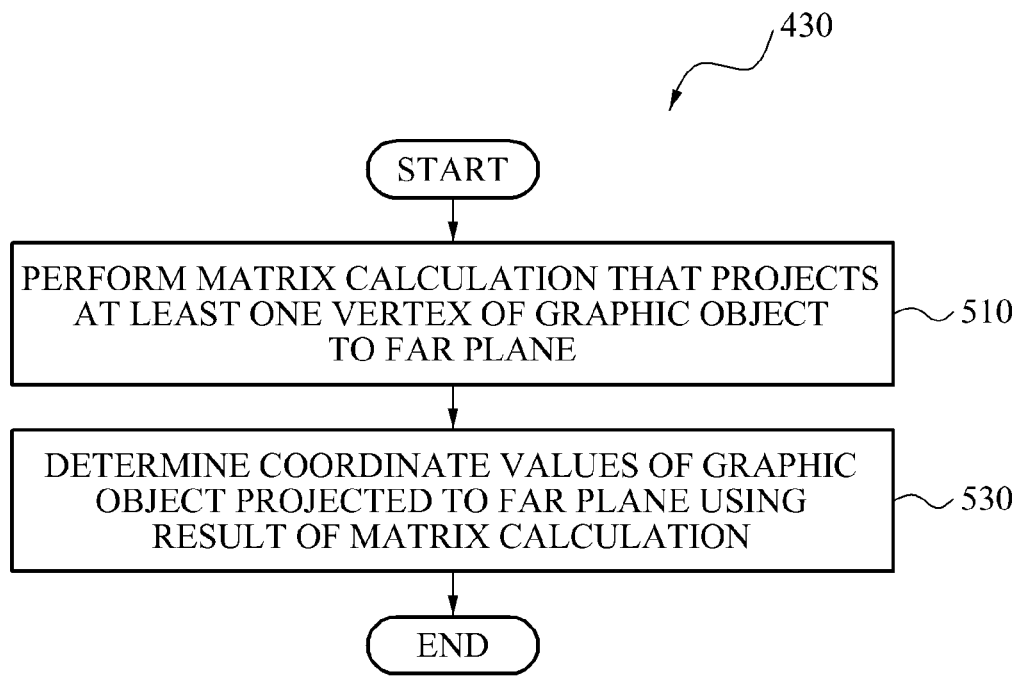
FIG. 5 illustrates an operational flow of a method of projecting vertices of a graphic object to a far plane in a light field image forming method according to example embodiments.

FIG. 5 illustrates an operational flow of a method of projecting vertices of a graphic object to a far plane in a light field image forming method according to example embodiments.

Referring to FIG. 5, a forming apparatus according to example embodiments may perform matrix calculation for projecting at least one vertex of the graphic object with respect to at least one camera to the far plane, in operation 510. For example, a matrix for projecting the at least one vertex to the far plane may be configured as shown in Expression 1.

$$\begin{pmatrix} \frac{2f}{r_f - l_f} & 0 & \frac{r_f + l_f}{r_f - l_f} & 0 \\ 0 & \frac{2f}{t_f - b_f} & \frac{t_f + b_f}{t_f - b_f} & 0 \\ 0 & 0 & \frac{-(n+f)}{n-f} & \frac{-2nf}{n-f} \\ 0 & 0 & -1 & 0 \end{pmatrix}$$ [Expression 1]

Here, f denotes a far distance of a frustum to be projected to the screen and n denotes a near distance of a frustum to be projected to the screen. $r_f$ denotes a right position at the far distance of the frustum to be projected to the screen and $l_f$ denotes a left position at the far distance of the frustum to be projected to the screen. $t_f$ denotes a top position at the far distance of the frustum to be projected to the screen and $b_f$ denotes a bottom position at the far distance of the frustum to be projected to the screen.

In operation 530, the matrix may output coordinate values of the graphic object projected to the far plane using a result of the calculation of operation 510.

Figure 6:
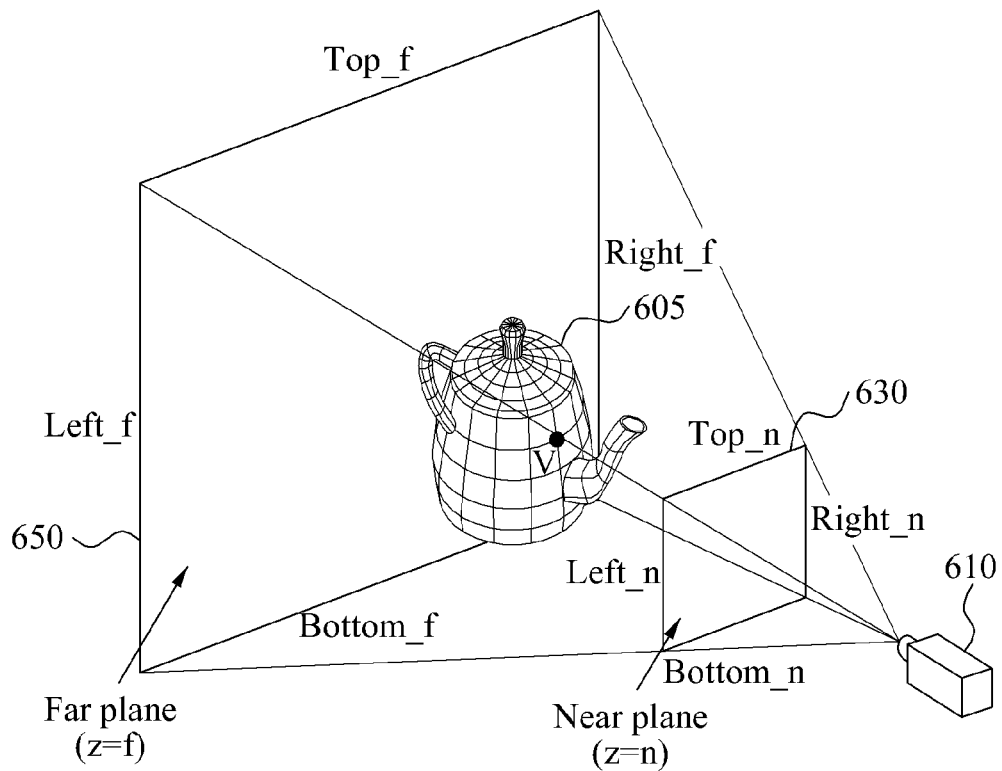
FIG. 6 illustrates a method of projecting vertices of a graphic object to a far plane by a light field image forming method according to example embodiments.
Figure 6:
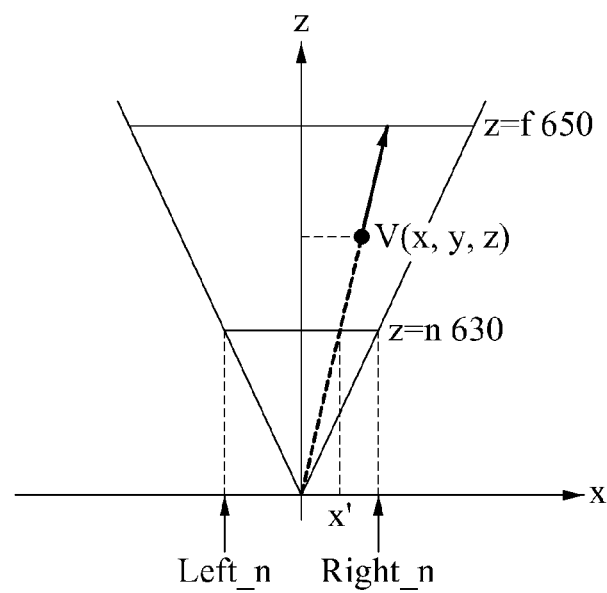

FIG. 6 illustrates a method of projecting vertices of a graphic object to a far plane by a light field image forming method according to example embodiments.

Referring to FIG. 6, a near plane 630 corresponds to a second distance (z=n) near to a camera 610 set at a position of a projector, and a far plane 650 corresponds to a first distance (z=f) far from the camera 610.

According to the method of forming the distance image according to the example embodiments, a vertex V of a graphic object 605 is projected to the far plane 650, rather than the near plane 630. Therefore, the light field image may be formed as if a front of the graphic object were photographed from a rear of the graphic object.

Here, the first distance (z=f) and the second distance (z=n) may be input from the viewer, such as in the form of an upper end position (top_f, top_n), lower end position (bottom_f, bottom_n), left position (left_f, left_n), and right position (right_f, right_n), for example.

Figure 7:
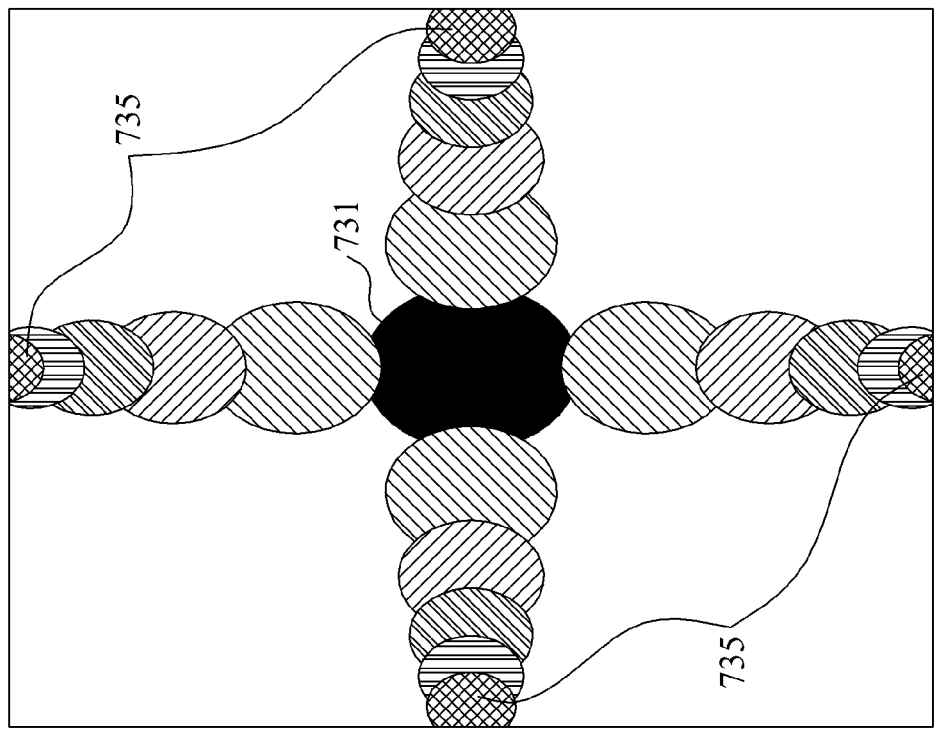
FIG. 7 illustrates a result of projecting vertices of a graphic object to a far plane by a light field image forming method of according to example embodiments.
Figure 7:
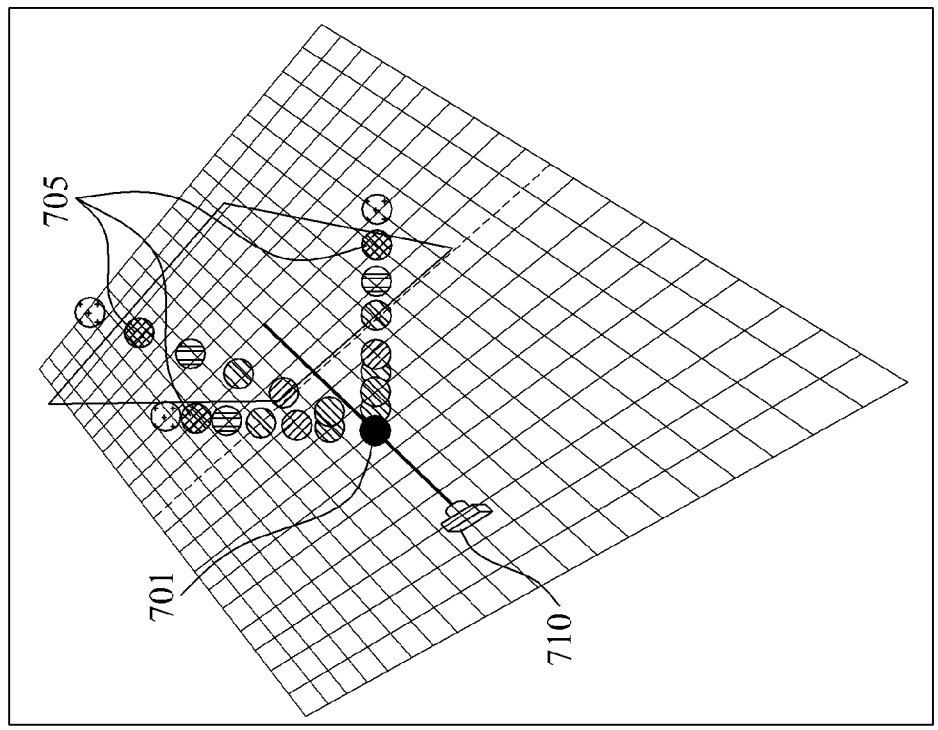

FIG. 7 illustrates a result of projecting vertices of a graphic object to a far plane by a light field image forming method of according to example embodiments.

Referring to FIG. 7, when a light field is formed at a rear view by projecting the vertices of the graphic object to the far plane according to the light field image forming method, a portion 701 of the image located at a plane near a camera 710 may be projected to the far plane and expressed as shown by 731, whereas portions 705 of the image located at a plane far from the camera 710 may be projected to a near plane and expressed as shown by 735.

Figure 8:
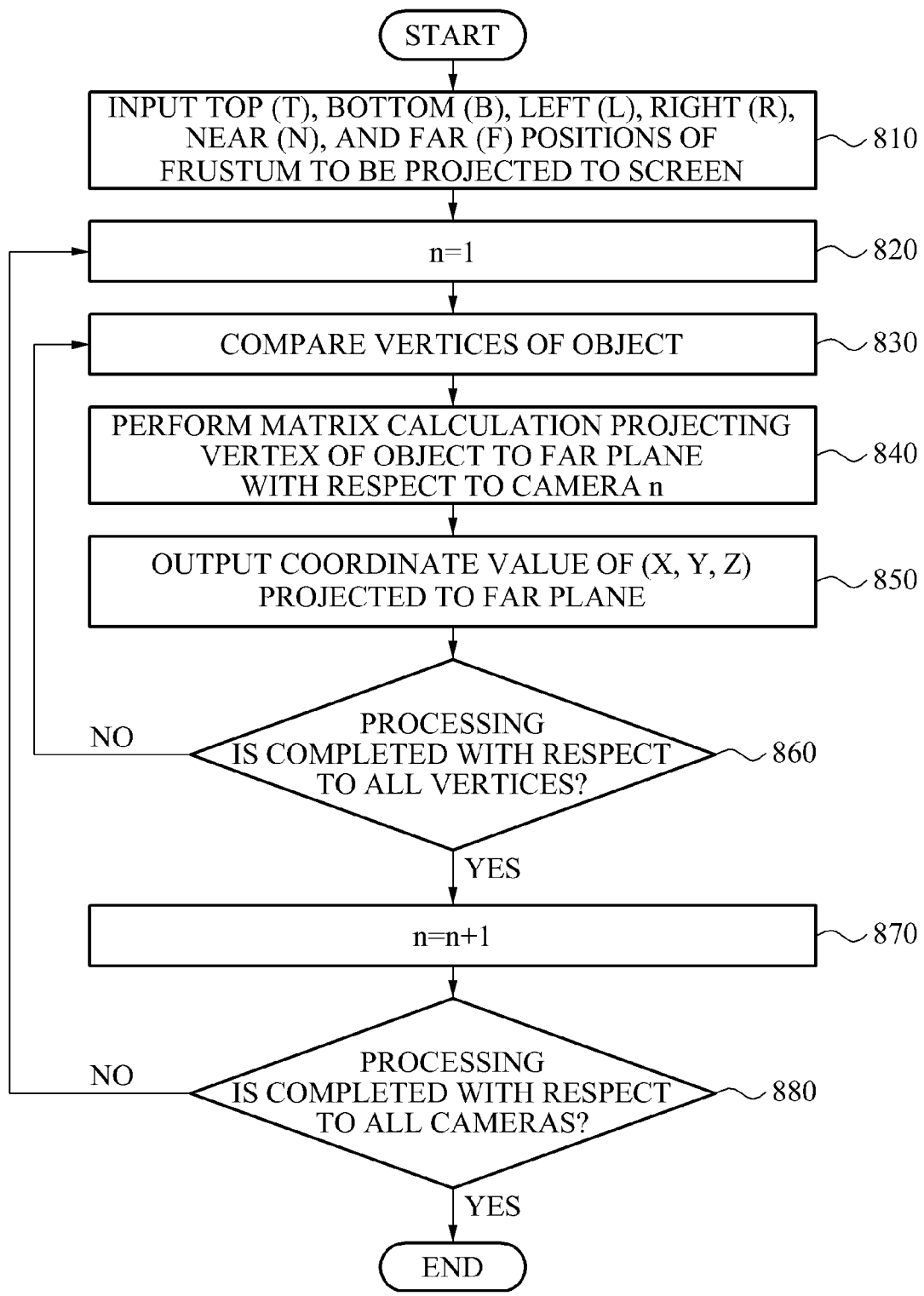
FIG. 8 illustrates an operational flow of a light field image forming method according to example embodiments.

FIG. 8 illustrates an operational flow of a light field image forming method according to example embodiments.

Referring to FIG. 8, in operation 810, a forming method according to the example embodiments may be input with a top position t, a bottom position b, a left position l, a right position r, a near position n, and a far position f of a frustum to be projected to a screen.

In operation 820, the forming apparatus may select any one camera, such as a first camera, for example, from a plurality of cameras. In operation 830, the forming apparatus may be provided with vertex values of a graphic object with respect to the selected camera.

In operation 840, the forming apparatus may perform matrix calculation that projects at least one vertex of the graphic object with respect to the selected camera to a far plane.

In operation 850, the forming apparatus may output coordinate values of the graphic object projected to the far plane using a result of the matrix calculation of operation 840.

In operation 860, the forming apparatus may determine whether coordinate values of the graphic object projected to the far plane are obtained with respect to all vertices of the graphic object with respect to the selected camera.

When any vertex of which the coordinate value is not obtained and is left as a result of determination of operation 860, the forming apparatus may repeat operations 830 to 850.

Conversely, when the coordinate values are obtained with respect to all vertices, the forming apparatus may select a next camera, such as a second camera, for example, among the plurality of cameras in operation 870.

In operation 880, the forming apparatus may repeat operations 820 to 860 with respect to the camera selected in operation 870. Also, the forming apparatus may repeat the operations until the coordinate values of all vertices of the graphic object projected to the far plane are obtained with respect to all of the plurality of cameras.

Figure 9:
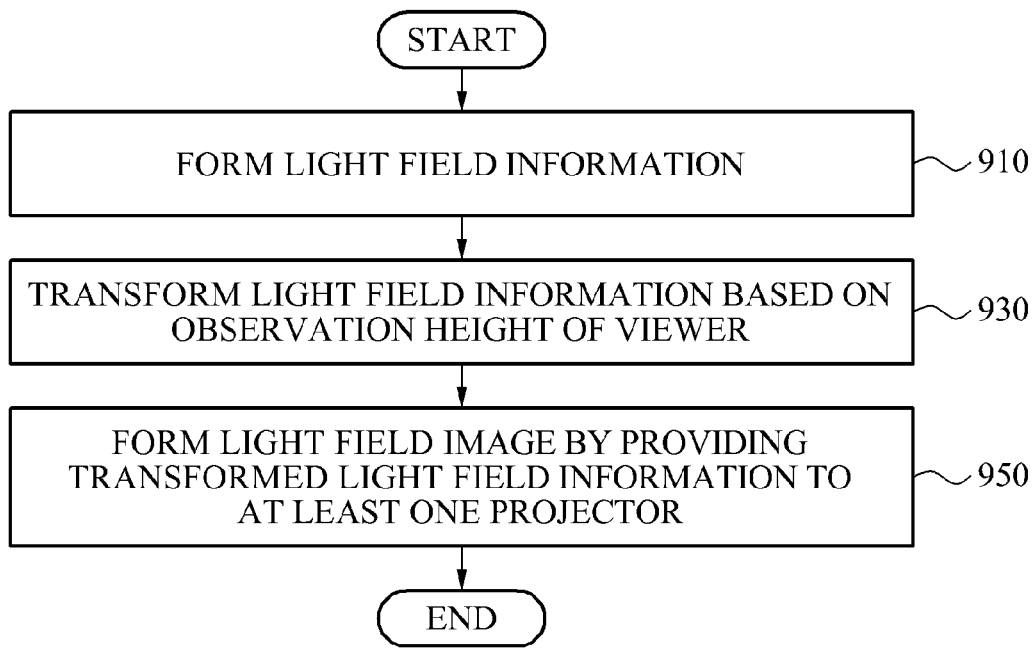
FIG. 9 illustrates an operational flow of a light field image forming method considering viewport transformation for a horizontal light field display, according to example embodiments.

FIG. 9 illustrates an operational flow of a light field image forming method considering viewport transformation for a horizontal light field display, according to example embodiments.

Referring to FIG. 9, in operation 910, a forming apparatus according to the example embodiments may form light field information by performing light field photographing with respect to a graphic object using at least one camera. Here, the at least one camera may have a view position or direction the same as a view position or direction of the at least one projector. The light field information may include information on a spot on the screen to which pixels of an input image from a projector are to be projected, or information on relationships between the pixels of the input image and the projection spot on the screen.

The forming apparatus may transform the light field information based on an observation position, or observation height, of the viewer in operation 930. In operation 930, the forming apparatus may transform the light field information based on the observation position of the viewer on a first plane, such as a plane 1110 of FIG. 11, for example, located in a direction of the viewer. A method of transforming the light field information based on the observation position of the viewer by the forming apparatus will be described with reference to FIG. 10.

In operation 950, the forming apparatus may form the light field image by providing the light field information transformed in operation 930 to at least one projector.

Figure 10:
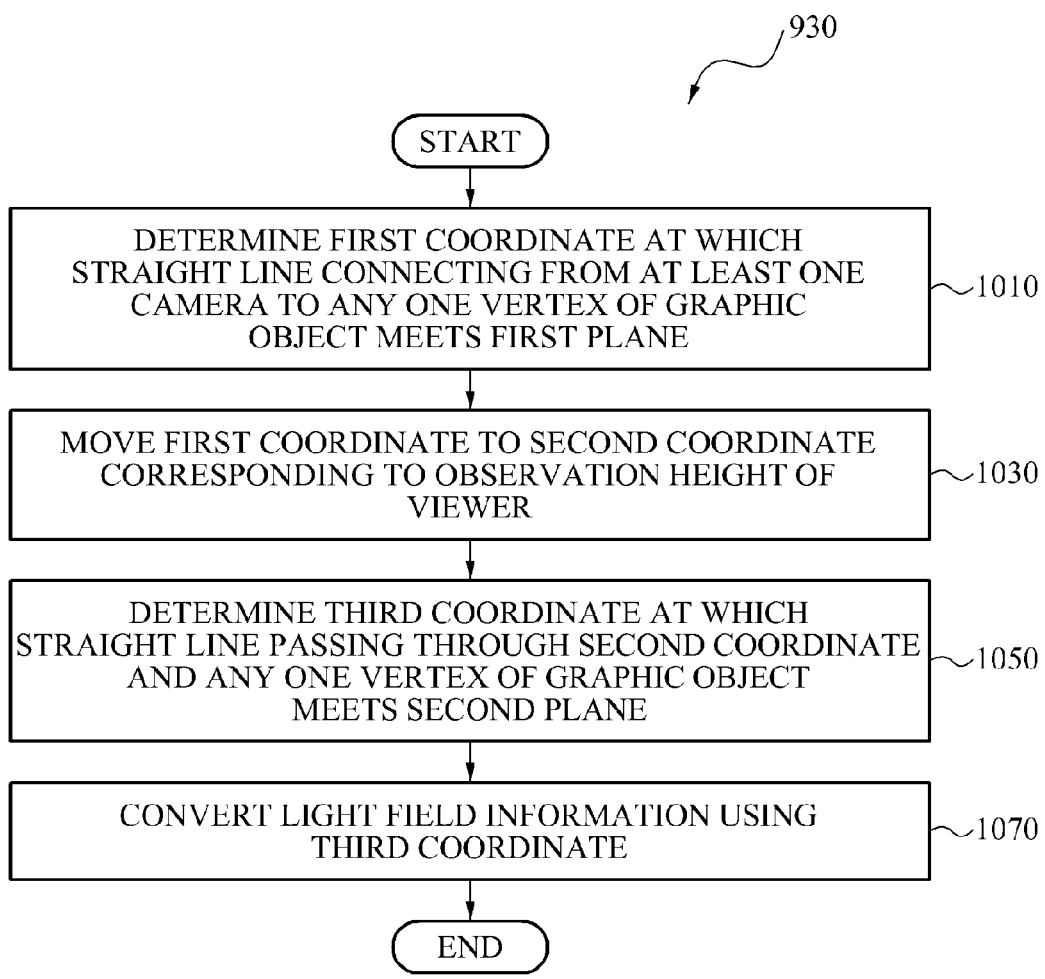
FIG. 10 illustrates an operational flow of a method of transforming light field information of FIG. 9 based on an observation position of a viewer, according to example embodiments.

FIG. 10 illustrates an operational flow of a method of transforming the light field information of FIG. 9 based on the observation position of the viewer, according to example embodiments.

Referring to FIG. 10, in operation 1010, a forming apparatus according to the example embodiments may determine a first coordinate at which a straight line connecting from at least one camera to any one vertex of a graphic object meets a first plane.

In operation 1030, the forming apparatus may move the first coordinate determined in operation 1010 to a second coordinate corresponding to the observation position of the viewer.

In operation 1050, the forming apparatus may determine a third coordinate at which a straight line passing through the second coordinate and any one vertex of the graphic object meets a second plane located in a direction to the screen reproducing the light field.

In operation 1070, the forming apparatus may transform the light field information using the third coordinate determined in operation 1050.

Figure 11:
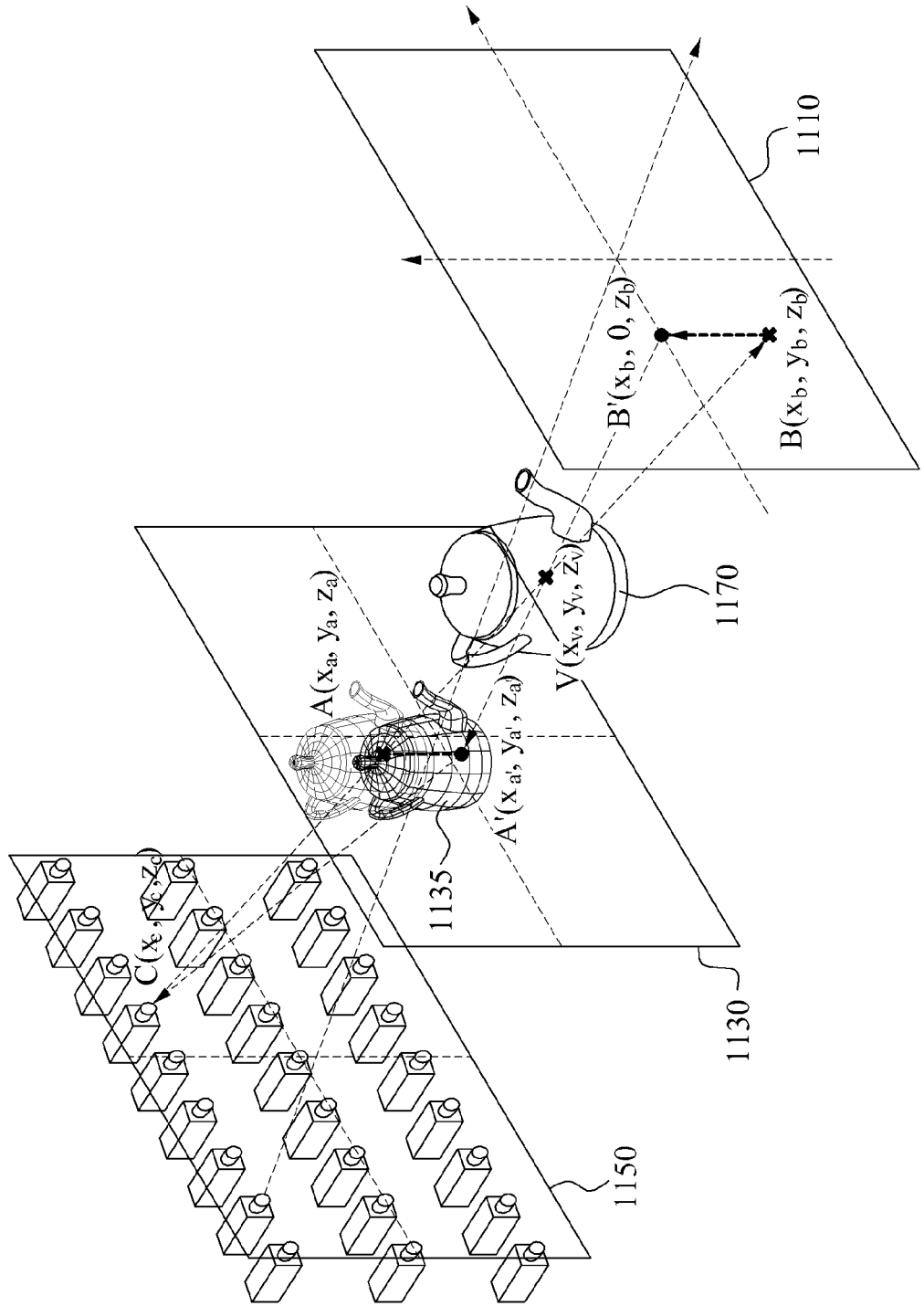
FIG. 11 illustrates the light field image forming method of FIG. 9.

FIG. 11 illustrates the light field image forming method of FIG. 9.

In FIG. 11, a camera position corresponds to a project position. $z_a = z_{a'} = 0$ is satisfied on a screen plane 1130. A value of z on a viewer plane 1110 is $z_b$.

A plurality of cameras are located on a source plane 1150 on which a plurality of projectors expressing the light field are located. The plurality of cameras may have same view positions and directions as the plurality of projectors. A straight line connecting from a position $C(x_c, y_c, z_c)$ of a center C of a first camera among the plurality of cameras to any one vertex $V(x_v, y_v, z_v)$ of a graphic object 1170 may determine a first coordinate $B(x_b, y_b, z_b)$ meeting the first plane 1110 (①). Here, for example, the first plane 1110 may be a viewer plane or a viewing plane that the viewer perceives.

Here, the straight line connecting from the position $C(x_c, y_c, z_c)$ of the center C of the first camera to the any one vertex $V(x_v, y_v, z_v)$ of the graphic object 1170 may pass through a position $A(x_a, y_a, z_a)$ of the screen plane 1130 which is located in the direction toward the screen reproducing the light field. The position $A(x_a, y_a, z_a)$ may indicate a position of an image 1135 formed by the graphic object 1170 projected to the screen plane 1130 when an eye level, or position, of the viewer is not taken into consideration.

A relationship between the vertices in process ① may satisfy Expression 2.

$$x_b = \frac{x_v - x_c}{z_v - z_c}(z_b - z_c) + x_c \quad \text{[Expression 2]}$$

The forming apparatus may move the first coordinate $B(x_b, y_b, z_b)$ to a second coordinate $B'(x_b, 0, z_b)$ which corresponds to an observation position of the viewer (②).

The forming apparatus may determine a third coordinate $A'(x_{a'}, y_{a'}, z_{a'})$ at which the straight line passing through the second coordinate $B'(x_b, 0, z_b)$ and the any one vertex $V(x_v, y_v, z_v)$ of the graphic object 1170 meets the second plane 1130 which is located in the direction of the screen reproducing the light field (③).

A relationship between the vertices in process ③ may satisfy Expression 3.

$$x_{a'} = \frac{x_v - x_b}{z_v - z_b}(-z_b) + x_b,$$

$$y_{a'} = \frac{y_v}{z_v - z_b}(-z_b) \quad \text{[Expression 3]}$$

The forming apparatus may transform the light field information by projecting the third coordinate $A'(x_{a'}, y_{a'}, z_{a'})$ to the position of the first camera.

Figure 12:
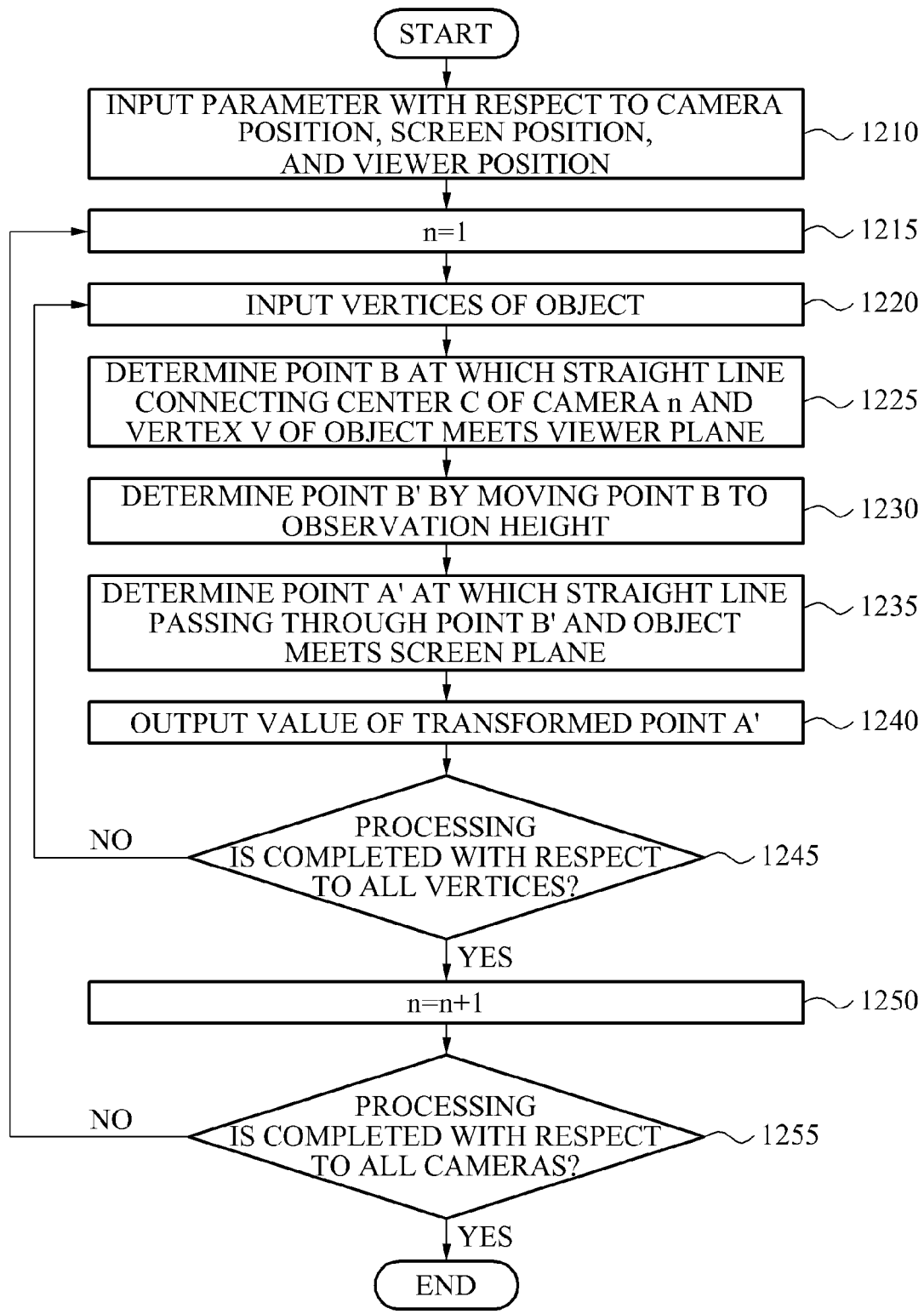
FIG. 12 illustrates an operational flow of a light field image forming method considering viewport transformation for a horizontal light field display, according to example embodiments.

FIG. 12 illustrates an operational flow of a light field image forming method considering viewport transformation for a horizontal light field display, according to example embodiments.

Referring to FIG. 12, in operation 1210, a forming apparatus according to the example embodiments may receive information including parameters indicating a position of at least one camera, a position of a first plane which is a viewer plane, and a position of a second plane which is a screen plane.

In operation 1220, the forming apparatus may select any one camera, such as a first camera, for example, from a plurality of cameras in operation 1215, and may receive a vertex value of a graphic object with respect to the selected camera.

In operation 1225, the forming apparatus may determine a point B at which a straight line connecting from a center of the camera selected in operation 1215 to a vertex of the graphic object meets the first plane, which is the viewer plane.

The forming apparatus may determine a point B' by moving the point B to the observation position of the viewer in operation 1230, and determine a point A' at which a straight line passing through the point B' and the graphic object meets the screen plane in operation 1235. Here, the point A' has a value obtained by transforming the point A in consideration of the observation position of the viewer.

In operation 1240, the forming apparatus may output the value of the transformed point A'.

In operation 1245, the forming apparatus may determine whether all vertices of the graphic object are transformed to the observation position of the viewer.

As a result of determination of operation 1245, when any vertex not transformed to the observation position of the viewer is present, the forming apparatus may repeat operations 1220 to 1240.

Conversely, when transformation to the observation position of the viewer is completed with respect to all vertices, the forming apparatus may select another camera in operation 1250.

The forming apparatus may repeat operations 1220 to 1240 with respect to the camera selected in operation 1250 until all the vertices of the graphic object are transformed to the observation position of the viewer with respect to all of the plurality of cameras, in operation 1255.

Figure 13:
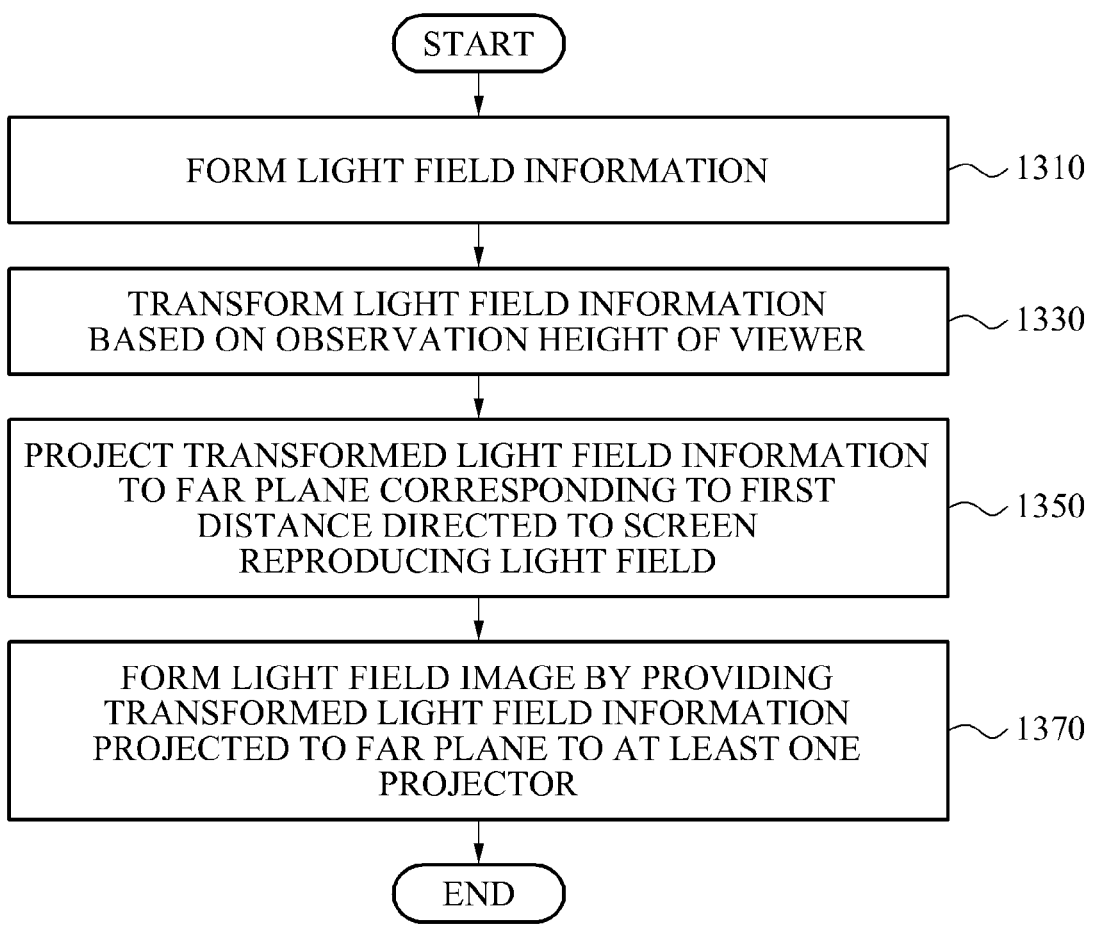
FIG. 13 illustrates an operational flow of a light field image forming method considering viewport transformation for a horizontal light field display, according to example embodiments.

FIG. 13 illustrates an operational flow of a light field image forming method considering viewport transformation for a horizontal light field display, according to example embodiments.

Referring to FIG. 13, a forming apparatus may form light field information by performing light field photographing with respect to a graphic object using at least one camera in operation 1310. The at least one camera may have a view position or direction the same as a view position or direction of the at least one projector expressing the light field.

In operation 1330, the forming apparatus may transform the light field information based on the observation position of the viewer.

In operation 1350, the forming apparatus may project the light field information transformed in operation 1330 to a far plane corresponding to a first distance directed to the screen reproducing the light field.

In operation 1370, the forming apparatus may form the light field image by providing the transformed light field information projected to the far plane in operation 1350 to at least one projector.

Figure 14:
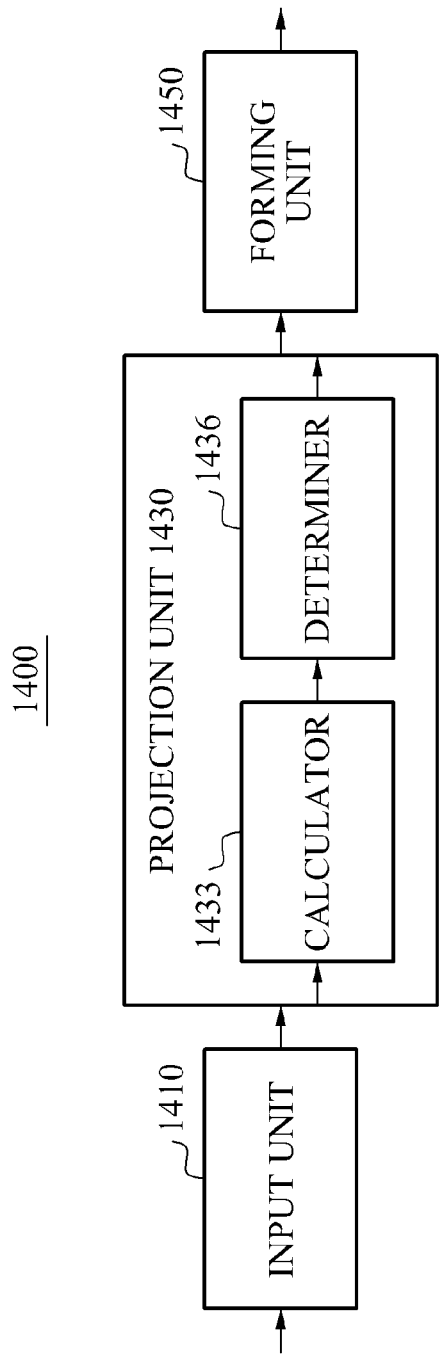
FIG. 14 illustrates a light field image forming apparatus according to example embodiments.

FIG. 14 illustrates a light field image forming apparatus according to example embodiments.

Referring to FIG. 14, an apparatus for forming a light field image, that is, a forming apparatus 1400 according to the example embodiments may include an input unit 1410, a projection unit 1430, and a forming unit 1450.

The input unit 1410 may receive vertices of a graphic object.

The projection unit 1430 may project the vertices of the graphic object to a far plane corresponding to a first distance directed to a screen reproducing a light field.

The projection unit 1430 may include a transformer (not shown) adapted to transform at least one vertex of the graphic object, which is located at a first distance farthest from at least one camera among the vertices, to be located at a second distance nearest to the at least one camera. In addition, the transformer may transform at least one vertex located at the second distance nearest to the at least one camera to be located at the first distance farthest from the at least one camera.

The projection unit 1430 may include a calculator 1433 and a determiner 1436.

The calculator 1433 may perform matrix calculation that projects at least one vertex of the graphic object from one camera to the far plane.

The determiner 1436 may determine coordinate values of the graphic object projected to the far plane using the calculation result of the calculator 1433.

The forming unit 1450 may form a light field image using the vertices projected to the far plane.

Figure 15:
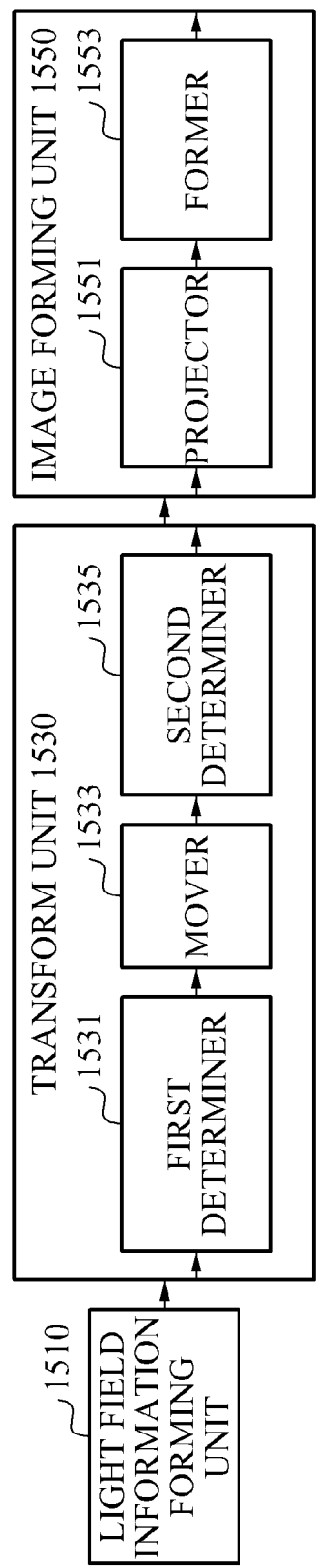
FIG. 15 illustrates a light field image forming apparatus considering viewport transformation for a horizontal light field display, according to example embodiments.

FIG. 15 illustrates a light field image forming apparatus considering viewport transformation for a horizontal light field display, according to example embodiments.

Referring to FIG. 15, an apparatus for forming a light field image, that is, a forming apparatus according to the example embodiments may include a light field information forming unit 1510, a transform unit 1530, and an image forming unit 1550.

The light field information forming unit 1510 may form light field information by performing light field photographing with respect to a graphic object using at least one camera. The at least one camera may have a view position or direction the same as a view position or direction of at least one projector expressing a light field.

The transform unit 1530 may transform the light field information based on an observation position of a viewer at a first plane located in a direction to a viewer. The transform unit 1530 may include a first determiner 1531, a mover 1533, and a second determiner 1535.

The first determiner 1531 may determine a first coordinate at which a straight line connecting from at least one camera to any one vertex of the graphic object meets the first plane.

The mover 1533 may move the first coordinate to a second coordinate corresponding to the observation position of the viewer.

The second determiner 1535 may determine a third coordinate at which a straight line passing through the second coordinate and any one vertex of the graphic object meets a second plane located in a direction to a screen reproducing the light field.

The transform unit 1530 may transform the light field information using the third coordinate.

The image forming unit 1550 may form the light field image by providing the transformed light field information to at least one projector. The image forming unit 1550 may include a projector 1551 and a former 1553.

The projector 1551 may project the transformed light field information to a far plane corresponding to a first distance directed to the screen.

The projector 1551 may include a calculator (not shown) and a determiner (not shown).

The calculator may perform matrix calculation that projects at least one vertex of the graphic object from one camera to a far plane.

The determiner may determine coordinate values of the light field information projected to the far plane using the calculation result of the calculator.

The forming unit 1553 may form the light field image by providing the transformed light field information projected to the far plane to at least one projector.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

The above-described embodiments may be recorded in computer-readable media including program instructions to implement various operations embodied by a computer. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The above-described devices may be configured to act as one or more software modules in order to perform the operations of the above-described embodiments, or vice versa.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A method for forming a light field image, the method comprising:
   receiving vertices of a graphic object;
   projecting the vertices of the graphic object to a far plane to reproduce a light field;
   performing a light field determination with respect to the graphic object using a rendering camera, the rendering camera being positioned or directed to correspond to a projector to reproduce a light field image; and
   transforming the determined light field based on an observation position of a viewer; and
   forming the light field image with respect to the graphic object by providing the transformed vertices of the graphic object and determining the light field.

2. The method of claim 1, wherein the projecting comprises:
   transforming at least one vertex of the graphic object, which is located at a first distance from at least one rendering camera among the vertices, to be located at a second distance from the at least one rendering camera; and
   transforming at least one vertex of the graphic object, which is located at the second distance from the at least one rendering camera among the vertices, to be located at the first distance from the at least one rendering camera.

3. The method of claim 1, wherein the projecting comprises:
   performing matrix calculation projecting at least one vertex of the graphic object with respect to at least one rendering camera to the far plane; and
   determining coordinate values of the graphic object projected to the far plane using a result of the matrix calculation.

4. The method of claim 1, further comprising:
   receiving top, bottom, left, and right positions of a screen to which the graphic object is to be projected, and a first distance and a second distance directed to the screen.

5. The method of claim 4, wherein the first distance corresponds to a farthest position from the position of the rendering camera in a direction to the screen at which the graphic object may be entirely expressed, and
   the second distance corresponds to a nearest position at which the graphic object may be entirely expressed.

6. A method for forming a light field image, the method comprising:
   generating light field information by performing light field extraction with respect to a graphic object using at least one rendering camera, the at least one rendering camera having a same view position or direction as a view position or direction of at least one projector expressing a light field;
   transforming the light field information based on an observation position of a viewer; and
   forming the light field image by providing the transformed light field information to the at least one projector.

7. The method of claim 6, wherein the transforming comprises:
   transforming the light field information based on the observation position of the viewer on a first plane located in a direction to the viewer.

8. The method of claim 7, wherein the transforming of the light field information based on the observation position on the first plane comprises:
   determining a first coordinate at which a straight line connecting from the at least one rendering camera to any one vertex of the graphic object meets the first plane;
   moving the first coordinate to a second coordinate corresponding to the observation position of the viewer;
   determining a third coordinate at which a straight line passing through the second coordinate and any one vertex of the graphic object meets a second plane located in a direction to the screen reproducing the light field; and
   transforming the light field information using the third coordinate.

9. The method of claim 6, further comprising:
   receiving information including a position of the at least one rendering camera, a position of the first plane, and a position of the second plane.

10. The method of claim 6, wherein the forming of the light field image comprises:
    projecting the transformed light field information to a far plane corresponding to a first distance directed to the screen reproducing the light field; and
    forming the light field image by providing the transformed light field information projected to the far plane to at least one projector.

11. The method of claim 10, wherein the projecting comprises:
    transforming light field information located at the first distance from the at least one rendering camera among the transformed light field information, to be located at a second distance from the at least one rendering camera; and transforming the light field information located at the second distance from the at least one rendering camera among the transformed light field information, to be located at the first distance from the at least one rendering camera.

12. The method of claim 10, wherein the projecting comprises:

performing matrix calculation projecting the transformed light field information from at least one rendering camera to the far plane; and determining coordinate values of the light field information projected to the far plane using a result of the matrix calculation.

13. The method of claim 10, further comprising:

receiving top, bottom, left, and right positions of a screen to which a graphic object is to be projected, and a first distance and a second distance directed to the screen.

14. The method of claim 6, wherein the observation position of the viewer comprises an observation height of the viewer.

15. A non-transitory computer readable recording medium storing a program to cause a computer to implement the method of claim 1.

16. An apparatus for forming a light field image, the apparatus comprising:

at least one processor; and a memory having instructions stored thereon executed by the at least one processor to perform:

forming light field information by performing light field extracting with respect to a graphic object using at least one rendering camera, the at least one rendering camera having a same view position or direction as a view position or direction of at least one projector expressing a light field;

transforming the light field information based on an observation position of a viewer; and forming the light field image by providing the transformed light field information to the at least one projector.

17. The apparatus of claim 16, wherein the transforming comprises:

determining a first coordinate at which a straight line connecting from at least one rendering camera to any one vertex of the graphic object meets the first plane;

moving the first coordinate to a second coordinate corresponding to the observation position of the viewer; and determining a third coordinate at which a straight line passing through the second coordinate and any one vertex of the graphic object meets a second plane located in a direction to a screen reproducing the light field, wherein the light field information is transformed using the third coordinate.

18. The apparatus of claim 16, wherein forming the light field image comprises:

projecting the transformed light field information to a far plane corresponding to a first distance directed to the screen reproducing the light field; and forming the light field image by providing the transformed light field information projected to the far plane to at least one projector.

19. The apparatus of claim 18, wherein the projecting comprises:

performing matrix calculation that projects at least one vertex of the graphic object from one camera to the far plane; and determining coordinate values of the graphic object projected to the far plane using a calculation result of the calculator.

20. A method of projecting a three-dimensional object onto a screen, the method comprising:

extracting a light field of the object using a rendering camera located at a position where a display projector generates the light field; and projecting the extracted light field of the object, wherein the extracted light field corresponds to a front view of the object extracted from a position behind the object corresponding to the position where the display projector reproduces the light field.

* * * * *